(12) United States Patent
Shimizu

(10) Patent No.: US 11,015,629 B2
(45) Date of Patent: May 25, 2021

(54) CONNECTOR TERMINAL FOR SUN VISOR

(71) Applicant: Yazaki Corporation, Tokyo (JP)

(72) Inventor: Tomohiko Shimizu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 147 days.

(21) Appl. No.: 16/527,531

(22) Filed: Jul. 31, 2019

(65) Prior Publication Data

US 2020/0040924 A1 Feb. 6, 2020

(30) Foreign Application Priority Data

Aug. 2, 2018 (JP) .............................. JP2018-145707

(51) Int. Cl.
*B60J 3/02* (2006.01)
*F16B 9/02* (2006.01)
*B60Q 3/252* (2017.01)

(52) U.S. Cl.
CPC ............... *F16B 9/02* (2013.01); *B60J 3/0217* (2013.01); *B60Q 3/252* (2017.02)

(58) Field of Classification Search
CPC ...... B60J 3/0217; B60J 3/0221; B60J 3/0252; B60Q 3/252; F16B 9/02
USPC .......................................... 296/97.12, 97.13
See application file for complete search history.

(56) References Cited

U.S. PATENT DOCUMENTS

| 6,139,083 | A | * | 10/2000 | Fischer | ................. | B60J 3/0239 |
| | | | | | | 296/97.11 |
| 6,676,129 | B2 | * | 1/2004 | Wilson | ................... | B60J 3/0217 |
| | | | | | | 296/97.12 |
| 7,108,309 | B2 | * | 9/2006 | Garcia | ................... | B60J 3/0221 |
| | | | | | | 296/97.9 |
| 2002/0149224 | A1 | * | 10/2002 | Wilson | ................... | B60J 3/0217 |
| | | | | | | 296/97.5 |
| 2011/0260491 | A1 | | 10/2011 | Ebisuoka | | |

FOREIGN PATENT DOCUMENTS

JP     2011-230559 A     11/2011

* cited by examiner

*Primary Examiner* — Joseph D. Pape
(74) *Attorney, Agent, or Firm* — Sughrue Mion, PLLC

(57) ABSTRACT

A connector terminal for a sun visor includes a body portion accommodated in a housing fixed to one side of an attachment member of a bracket, the bracket configured to be attached to the attachment member, a mating connection portion provided on one end of the body portion and connected to a mating terminal arranged on one side of the attachment member, an arm connection portion provided on the other end of the body portion and connected to an end of an arm portion rotatably supporting a sun visor body arranged on the other side of the attachment member, the end being inserted into the bracket, and a fixed portion provided between the mating connection portion and the arm connection portion of the body portion and fixed to the housing.

3 Claims, 11 Drawing Sheets

CONNECTOR TERMINAL FOR SUN VISOR

CROSS REFERENCE TO RELATED APPLICATION

This application is based upon and claims the benefit of priority from the prior Japanese Patent Application No. 2018-145707, filed on Aug. 2, 2018, the entire contents of which are incorporated herein by reference.

BACKGROUND

Technical Field

The disclosure relates to a connector terminal for a sun visor. In detail, the disclosure relates to a connector terminal for a sun visor, which includes a mating connection portion connected to a mating terminal and an arm connection portion connected to an arm portion of the sun visor.

Related Art

In recent years, as a connector terminal for a sun visor, there has been known a connector terminal for a sun visor including a body portion accommodated in a housing fixed to a vehicle exterior side of a bracket attached to a ceiling of a vehicle interior as an attachment member, a mating connection portion connected to a mating terminal provided on one end of the body portion and arranged on the vehicle exterior side, and an arm connection portion provided on the other end of the body portion and connected to an end of a support shaft, as an arm portion that rotatably supports a sun visor body arranged on the vehicle interior side, the end being inserted into a bracket (see JP 2011-230559 A).

In the connector terminal for a sun visor, a pair of connector terminals for a sun visor are accommodated in the housing, and a pair of arm connection portions are connected so as to be sandwiched between a pair of conduction portions provided at an end of the support shaft.

In addition, the sun visor body is rotated, such that the pair of arm connection portions and the pair of conduction portions of the support shaft switch between a contact state and a non-contact state, and turn-on and turn-off of an illumination apparatus provided in the sun visor body are switched.

Incidentally, in the connector terminal for a sun visor as disclosed in JP 2011-230559 A, the mating connection portion is connected to the mating terminal in a state where the body portion is accommodated in the housing, and the arm connection portion is connected to an end of the arm portion.

Since the mating connection portion and the arm connection portion are directly connected to each other without anything therebetween and in a state where the body portion is accommodated in the housing, vibration from the mating connection portion side to the arm connection portion side or vibration from the arm connection portion side to the mating connection portion side is directly transmitted, and contact therebetween becomes unstable, which leads to a concern that the reliability of connection may deteriorate.

SUMMARY

The disclosure is directed to a connector terminal for a sun visor which is capable of maintaining the reliability of connection.

A connector terminal for a sun visor according to an embodiment includes a body portion accommodated in a housing fixed to one side of an attachment member of a bracket, the bracket configured to be attached to the attachment member, a mating connection portion provided on one end of the body portion and connected to a mating terminal arranged on one side of the attachment member, an arm connection portion provided on the other end of the body portion and connected to an end of an arm portion rotatably supporting a sun visor body arranged on the other side of the attachment member, the end being inserted into the bracket, and a fixed portion provided between the mating connection portion and the arm connection portion of the body portion and fixed to the housing.

In the connector terminal for a sun visor, the fixed portion fixed to the housing is provided between the mating connection portion and the arm connection portion of the body portion. For this reason, vibration from the mating connection portion side to the arm connection portion side or vibration from the arm connection portion side to the mating connection portion side is input to the fixed portion and is not directly transmitted.

Therefore, in such a connector terminal for a sun visor, one vibration is not directly transmitted to the other side by being absorbed by the fixed portion, and thus it is possible to stabilize contact and to maintain the reliability of connection.

A bent portion may be provided in at least one of an area between the mating connection portion and the fixed portion of the body portion and an area between the arm connection portion and the fixed portion of the body portion.

In the connector terminal for a sun visor, when the bent portion is provided at at least one of an area between the mating connection portion and the fixed portion of the body portion and an area between the arm connection portion and the fixed portion, it is possible to attenuate vibration by the bent portion and to further maintain the reliability of connection.

The arm connection portion may be provided in the body portion so as to be elastically deformable, and the bent portion may be provided between the mating connection portion and the fixed portion.

In the connector terminal for a sun visor, when the arm connection portion is provided in the body portion so as to be elastically deformable and the bent portion is provided between the mating connection portion and the fixed portion, it is possible to attenuate and absorb vibration from the mating connection portion side to the arm connection portion side by the bent portion and the fixed portion and to suppress influence on an elastic force of the arm connection portion.

According to the above-described configuration, an effect is exhibited which is capable of providing a connector terminal for a sun visor capable of maintaining the reliability of connection.

DETAILED DESCRIPTION

Figure 1:
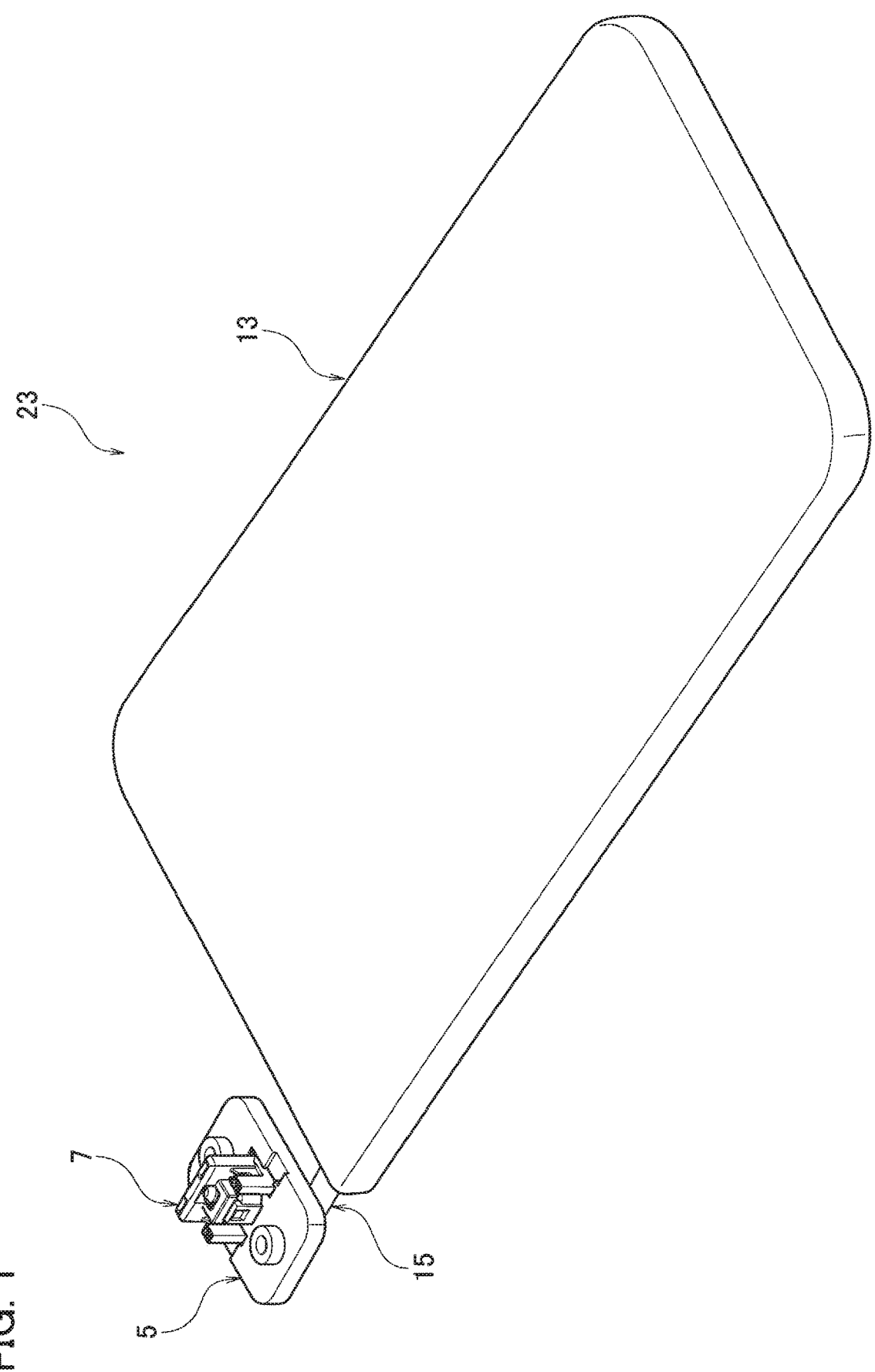
FIG. 1 is a perspective view of a sun visor to which a connector terminal for a sun visor according to an embodiment is applied.
Figure 2:
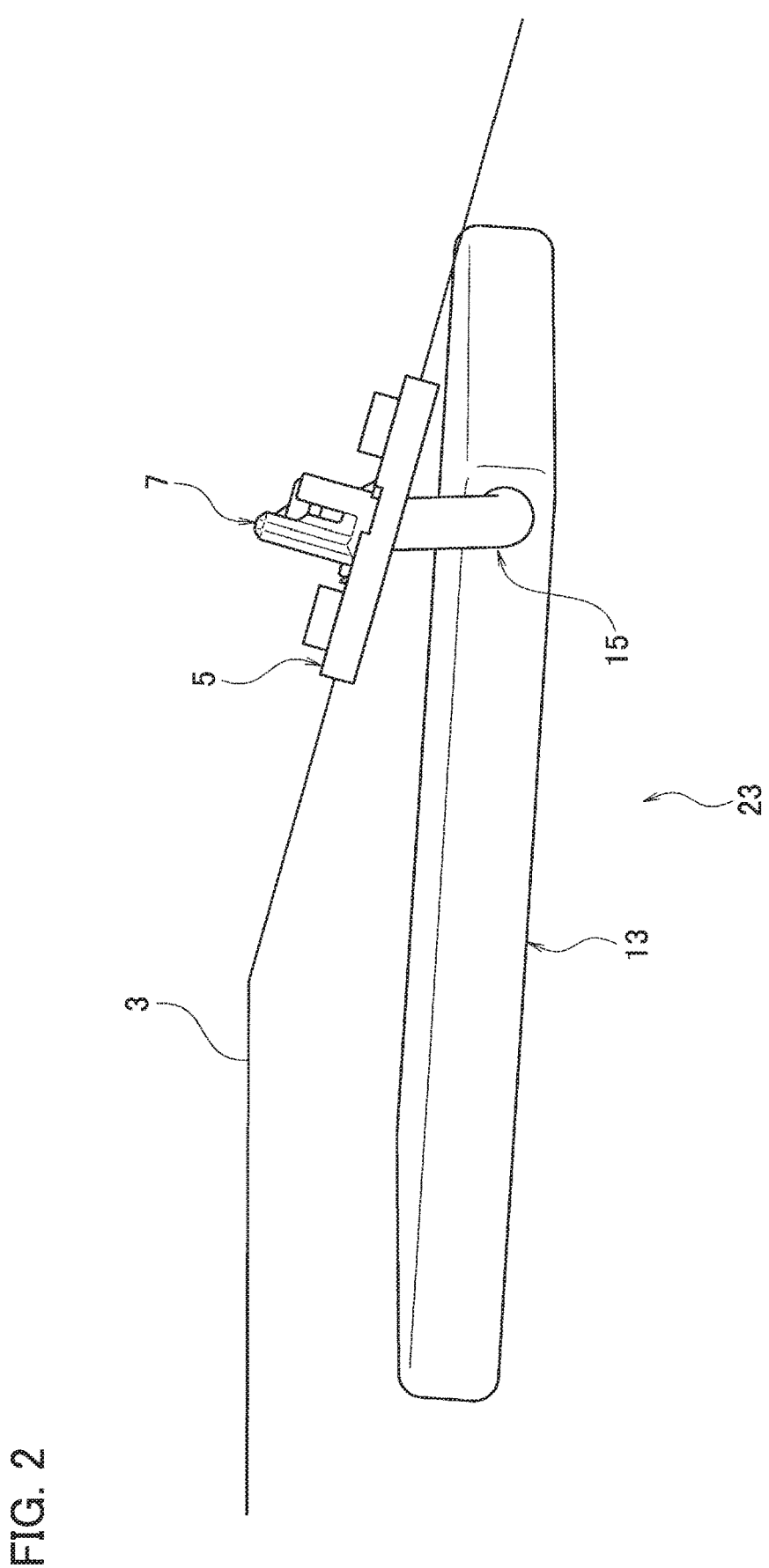
FIG. 2 is a side view when the sun visor to which the connector terminal for a sun visor according to the embodiment is applied is attached to an attachment member.
Figure 3:
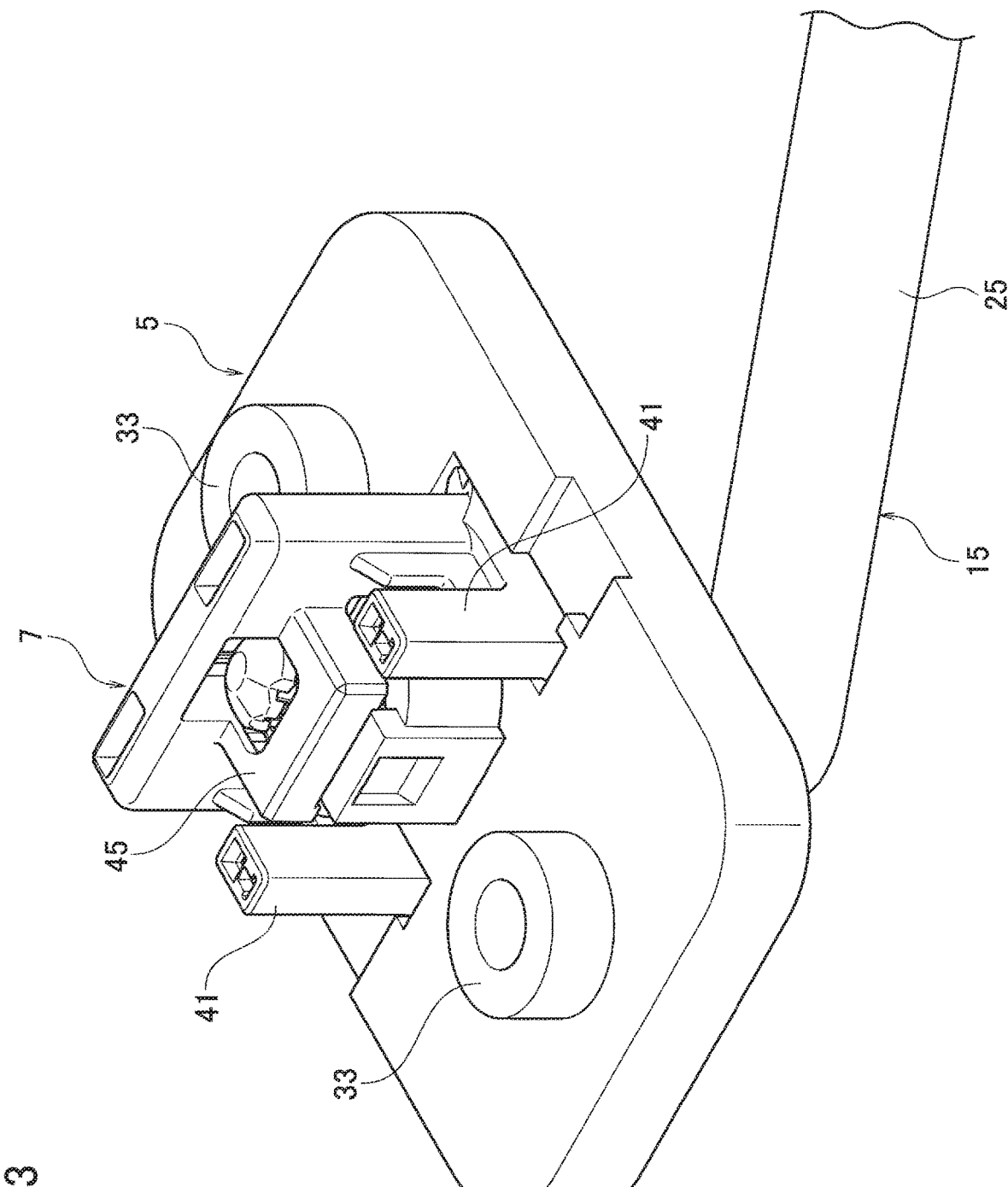
FIG. 3 is a perspective view when the connector terminal for a sun visor according to the embodiment is accommodated in a housing and the housing is installed to a bracket.
Figure 4:
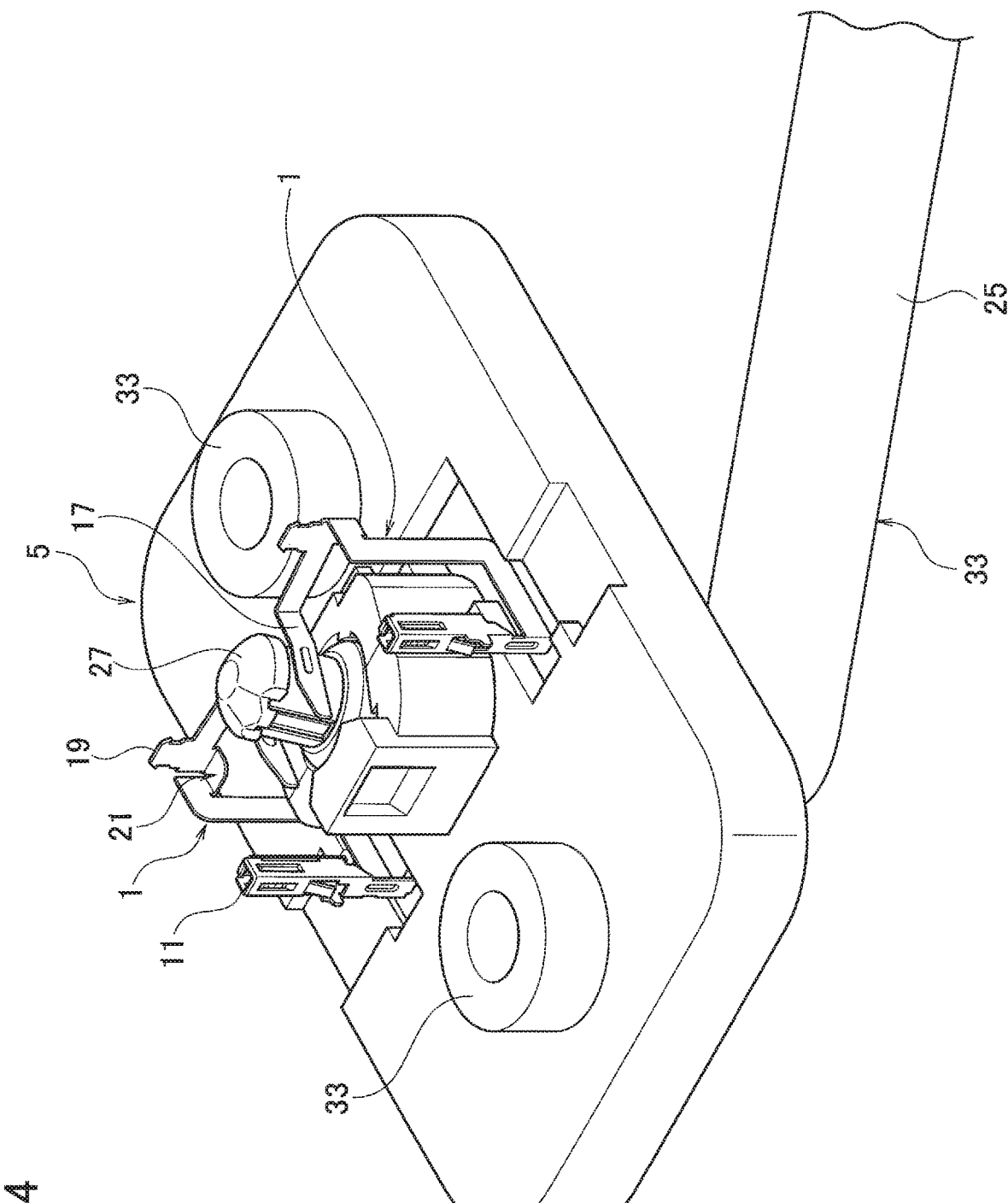
FIG. 4 is a perspective view when the housing is removed from the state illustrated in FIG. 3.
Figure 5:
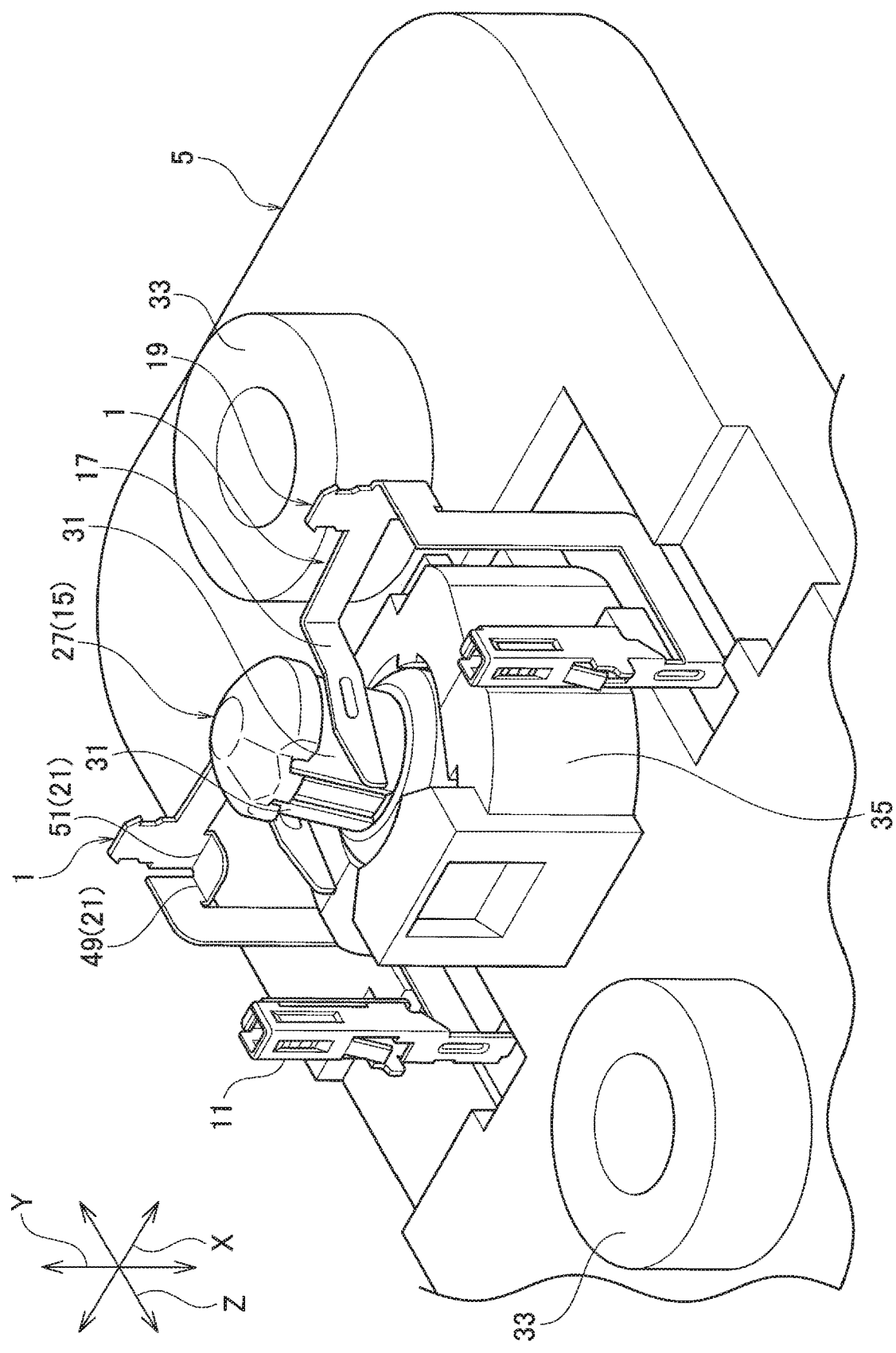
FIG. 5 is an enlarged view of main components illustrated in FIG. 4.
Figure 6:
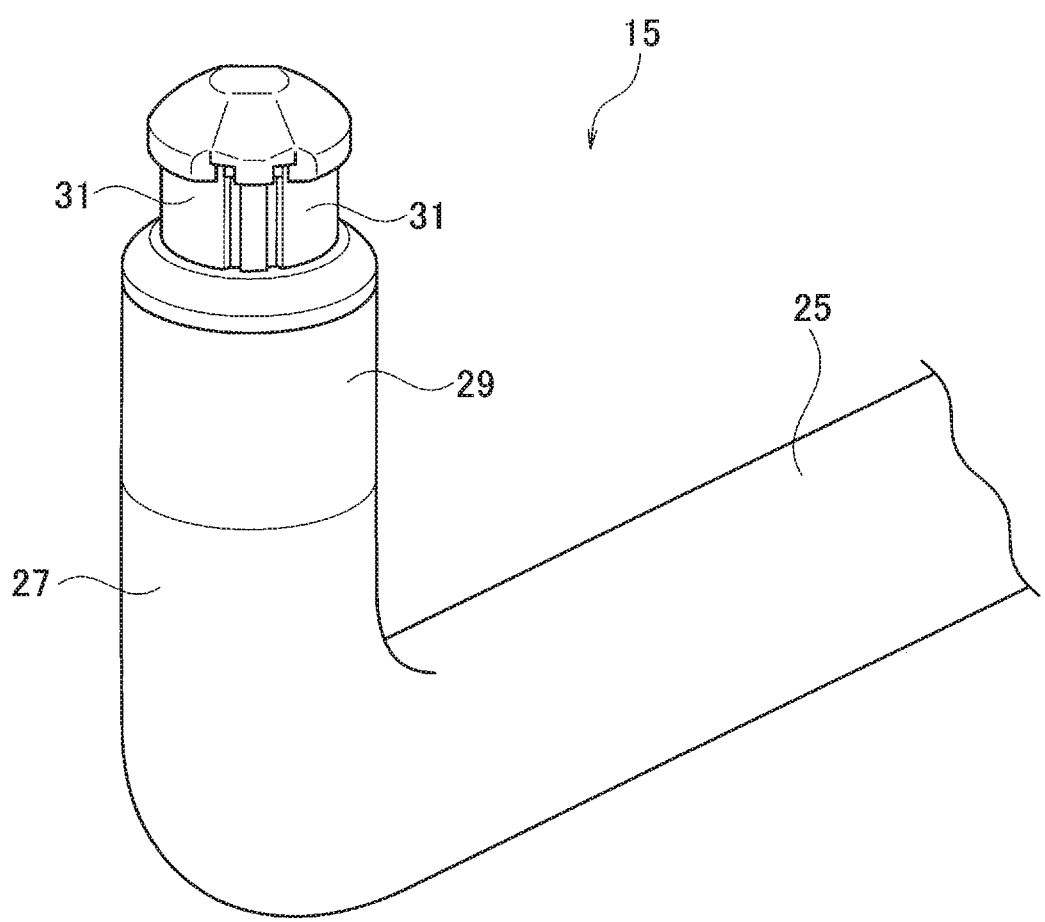
FIG. 6 is a perspective view of an arm portion to which the connector terminal for a sun visor according to the embodiment is applied.
Figure 7:
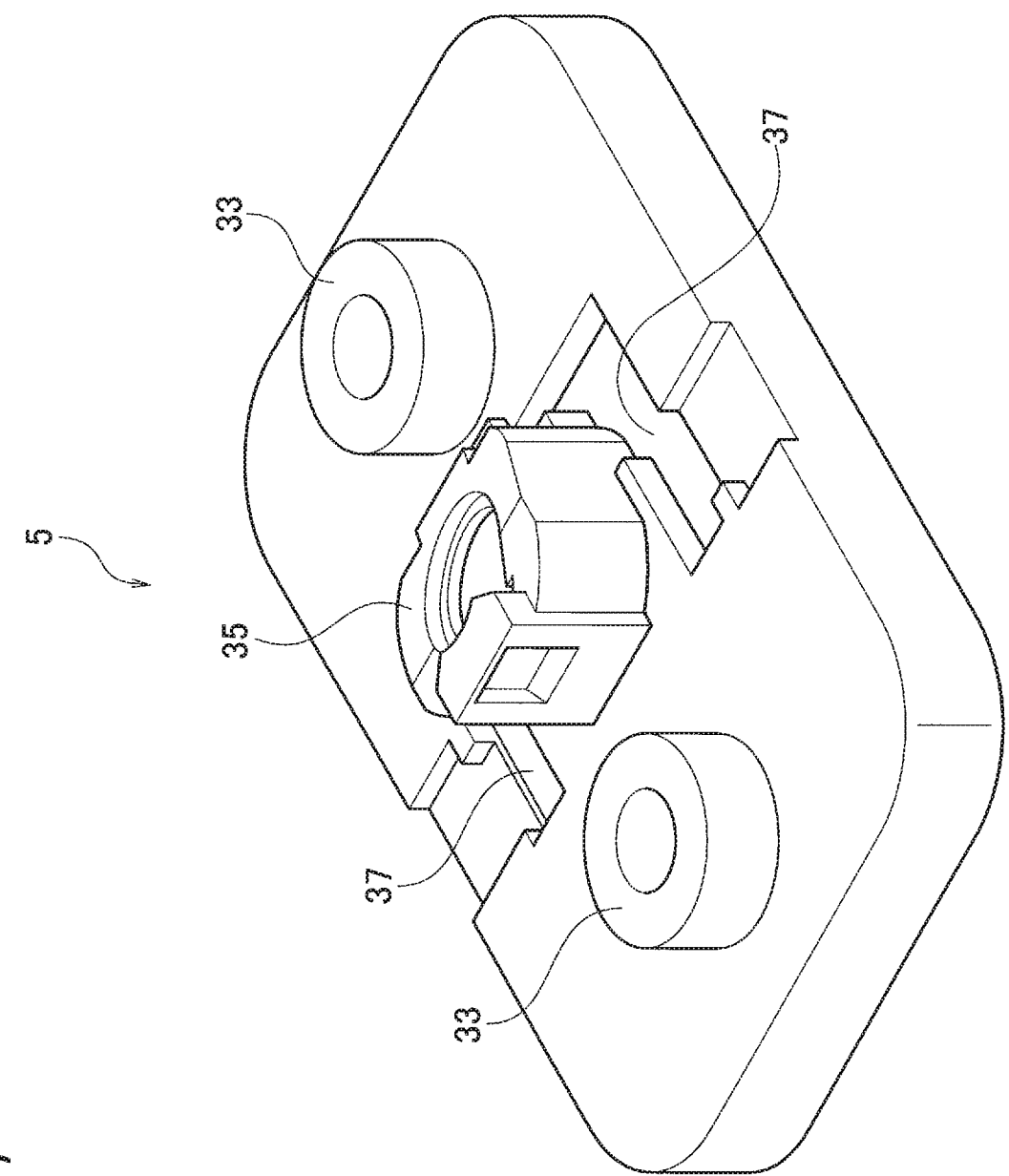
FIG. 7 is a perspective view of a bracket to which the connector terminal for a sun visor according to the embodiment is applied.
Figure 8:
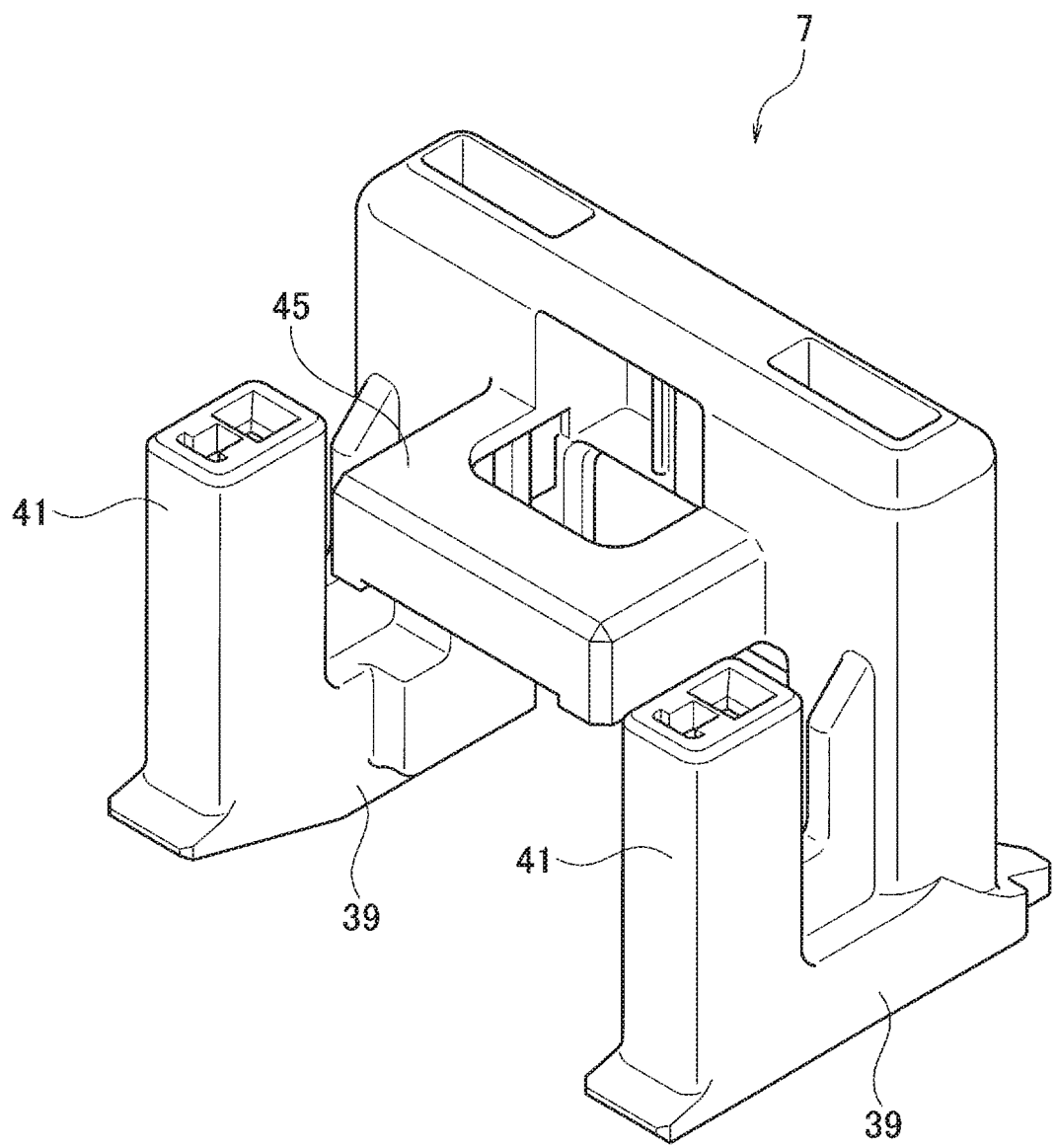
FIG. 8 is a perspective view of a housing to which the connector terminal for a sun visor according to the embodiment is applied.
Figure 9:
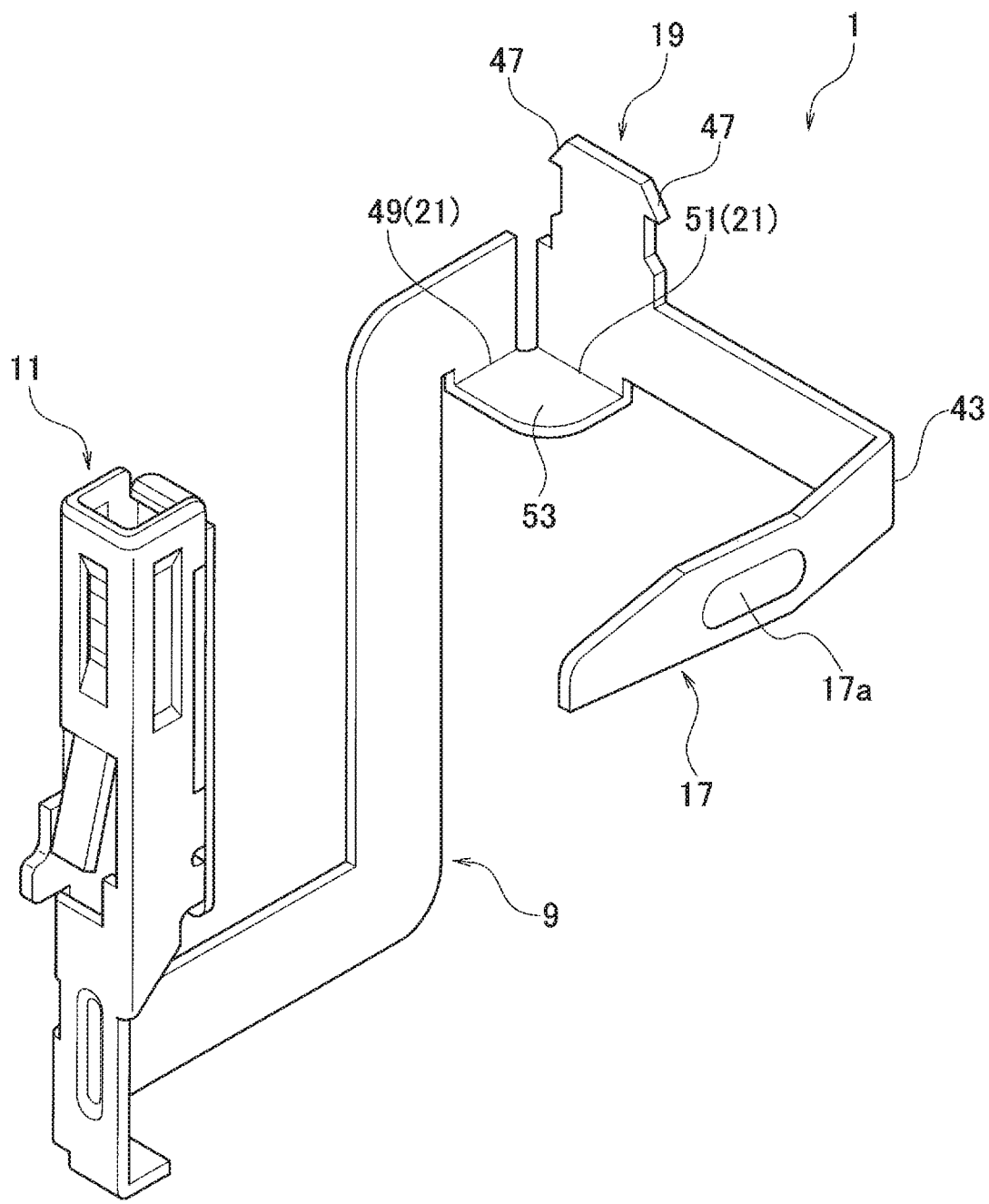
FIG. 9 is a perspective view of the connector terminal for a sun visor according to the embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

A connector terminal 1 for a sun visor according to the present embodiment includes a body portion 9 which is accommodated in a housing 7 fixed to one side (hereinafter, referred to as a "vehicle exterior side") of an attachment member 3 of a bracket 5 attached to the attachment member 3, a mating connection portion 11 which is provided on one end of the body portion 9 and connected to a mating terminal arranged on the vehicle exterior side, and an arm connection portion 17 which is provided on the other end of the body portion 9 and connected to an end of an arm portion 15 rotatably supporting a sun visor body 13 arranged on the other side (hereinafter, referred to as a "vehicle interior side") of the attachment member 3, the end being inserted into the bracket 5.

In addition, a fixed portion 19 fixed to the housing 7 is provided between the mating connection portion 11 and the arm connection portion 17 of the body portion 9.

In addition, a bent portion 21 is provided between the mating connection portion 11 and the fixed portion 19 of the body portion 9.

Further, the arm connection portion 17 is provided in the body portion 9 so as to be elastically deformable.

As illustrated in FIGS. 1 to 10, the connector terminal 1 for a sun visor is applied to a sun visor 23 attached to the ceiling of the vehicle interior as the attachment member 3.

The sun visor 23 includes the sun visor body 13, the arm portion 15, the bracket 5, the housing 7, and the connector terminal 1 for a sun visor.

The sun visor body 13 is formed to have a rectangular shape and is configured so that a mirror (not illustrated) and a lamp (not illustrated) irradiating the mirror are arranged on the surface thereof and an illumination apparatus (not illustrated) turning the lamp on and off is accommodated therein.

In the sun visor body 13, and the arm portion 15 which is inserted into a long side portion and exposed toward the ceiling side of the vehicle interior as the attachment member 3 from an end thereof is arranged.

The arm portion 15 is configured so that two conductors (not illustrated) electrically connected to the illumination apparatus accommodated in the sun visor body 13 are insert-molded therein, and the arm portion 15 includes a long shaft portion 25 and a short shaft portion 27.

The long shaft portion 25 is inserted into the sun visor body 13 in the vicinity of the long side of the sun visor body 13 and rotatably supports the sun visor body 13 between a storage position (a position where a closed state is set with respect to the attachment member 3) and a light shielding position (a position where a closed state is set with respect to a windshield and a side glass) around the axis center of the long shaft portion 25.

A pair of contact portions (not illustrated) at which the two conductors insert-molded inside the arm portion 15 are arranged so as to be exposed are provided at an end of the long shaft portion 25 which is positioned inside the sun visor body 13, and a pair of terminals (not illustrated) provided in the illumination apparatus are in contact with the pair of contact portions.

For example, the pair of contact portions and the pair of terminals are not in contact with each other at the storage position of the sun visor body 13 to turn off the lamp and are in contact with each other at the light shielding position of the sun visor body 13 to turn on the lamp.

The short shaft portion 27 is provided at an end of the long shaft portion 25 as one continuous member, the end being exposed to the outside of the sun visor body 13.

The short shaft portion 27 extends from the end of the long shaft portion 25 which is exposed from the sun visor body 13 toward the attachment member 3 side so that the arm portion 15 is formed to have an L shape.

A rotating portion 29 rotating around the axis center of the short shaft portion 27 is provided on the attachment member 3 side, and the arm portion 15 is supported by the bracket 5 so as to be rotatable around the axis center of the short shaft portion 27 by inserting the rotating portion 29 into the bracket 5 and fixing the rotating portion 29.

The short shaft portion 27 is supported by the bracket 5 in this manner, and thus the sun visor body 13 is rotatable between a front position (a position where the sun visor body is moved to the windshield side) and a side position (a position where the sun visor body is moved to the side glass side) around the axis center of the short shaft portion 27.

A pair of contact portions 31 and 31 at which two conductors insert-molded inside the arm portion 15 are arranged so as to be exposed are provided at an end of the short shaft portion 27, the end being inserted into the bracket 5.

The bracket 5 is formed to have a rectangular plate shape and is fixed to the attachment member 3 through a fixing unit such as a bolt by using attachment portions 33 and 33 respectively provided on both sides in the longitudinal direction thereof.

A supporting portion 35 into which an end of the short shaft portion 27 of the arm portion 15 is inserted, in which the rotating portion 29 of the short shaft portion 27 is pressed, and which is formed to have a tubular shape rotatably supporting the arm portion 15 is provided at the central portion of the bracket 5.

An end of the short shaft portion 27 of the arm portion 15 is arranged on the vehicle exterior side of the bracket 5, the end being inserted into the supporting portion 35 of the bracket 5, and the housing 7 is arranged so as to cover the end of the short shaft portion 27.

The housing 7 is formed of an insulating material such as synthetic resins, is arranged so as to cover the supporting portion 35 of the bracket 5, and is fixed to the bracket 5 by engaging engagement portions 39 and 39 with portions to be engaged 37 and 37 provided on both sides of the supporting portion 35.

The housing 7 is provided with a pair of fitting portions 41 and 41 which are arranged on the vehicle exterior side and to which a mating housing (not illustrated) connected to a power source for power supply is fitted.

A pair of connector terminals 1, 1 for a sun visor are accommodated in the housing 7, and the mating housing is fitted to the pair of fitting portions 41 and 41, such that it is possible to supply power to the illumination apparatus accommodated in the sun visor body 13 through the arm portion 15.

Each of the pair of connector terminals 1, 1 for a sun visor includes the body portion 9, the mating connection portion 11, the arm connection portion 17, and the fixed portion 19.

Meanwhile, since the pair of connector terminals 1, 1 for a sun visor are formed to be laterally symmetrical to each other, one connector terminal 1 for a sun visor will be described below and the other connector terminal 1 for a sun visor will not be described.

The body portion 9 is formed of a conductive material, is formed to have a flat plate shape, and is subjected to bending processing so that the mating connection portion 11 is provided on one end thereof and the arm connection portion 17 is provided on the other end.

The mating connection portion 11 is formed to have a box shape in which an elastically deformable elastic piece having a contact point is arranged by performing bending processing on one end of the body portion 9.

The mating connection portion 11 is arranged inside the fitting portion 41 in a state where the mating connection portion is accommodated in the housing 7 and comes into contact with a mating terminal (not illustrated) accommodated in the mating housing by the mating housing being fitted to the fitting portion 41, whereby the connector terminal 1 for a sun visor and the mating terminal are electrically connected to each other.

The arm connection portion 17 is provided so as to be elastically deformable through a bent portion 43 by performing bending processing on the other end of the body portion 9 and is provided with a contact point 17a protruding toward the contact portion 31 of the arm portion 15.

The arm connection portion 17 is arranged facing the arm connection portion 17 of the other connector terminal 1 for a sun visor with the pair of contact portions 31 and 31 (an end of the short shaft portion 27) interposed therebetween inside a protection portion 45 exposed toward the pair of contact portions 31 and 31 of the arm portion 15 of the housing 7 in a state where the arm connection portion is accommodated in the housing 7.

Such an arm connection portion 17 comes into contact with the arm connection portion 17 of the other connector terminal 1 for a sun visor so as to sandwich the pair of contact portions 31 and 31 using a biasing force, and the connector terminal 1 for a sun visor and the arm portion 15 are electrically connected to each other.

Here, the arm portion 15 is configured to be rotatable around the axis center of the short shaft portion 27 with respect to the bracket 5, and thus the sun visor body 13 is rotatable between the front position and the side position.

A pair of arm connection portions 17 and 17 and a pair of contact portions 31 and 31 come into contact with each other, for example, at the front position of the sun visor body 13 to turn on the lamp and do not come into contact with each other at the side position of the sun visor body 13 to turn off the lamp with respect to the movement of the sun visor body 13.

When the connector terminal 1 for a sun visor is accommodated in the housing 7 in a state where the mating connection portion 11 and the arm connection portion 17 of the body portion 9 are directly connected to each other without anything therebetween, vibration from the mating connection portion 11 side to the arm connection portion 17 side or vibration from the arm connection portion 17 side to the mating connection portion 11 side is directly transmitted, which leads to a concern that contact therebetween may become unstable.

In particular, the mating connection portion 11 has a connection structure of a male-female fitting terminal, and the arm connection portions 17 have a connected structure in which the arm connection portions 17 are connected to each other using a biasing force generated due to electric deformation. Accordingly, free movement between the mating connection portion 11 and the mating terminal is directly transmitted to the arm connection portion 17, which leads to a concern that contact between the arm connection portion 17 and the contact portion 31 of the arm portion 15 may become unstable.

Consequently, the fixed portion 19 fixed to the housing 7 is provided between the mating connection portion 11 and the arm connection portion 17 of the body portion 9.

The fixed portion 19 protrudes toward an inner wall surface of the housing 7 from a side surface positioned between the mating connection portion 11 and the arm connection portion 17 of the body portion 9.

The fixed portion 19 is provided with press-in portions 47 and 47 respectively protruding outward so as to have an inclined shape on both sides in the width direction thereof, and the press-in portions 47 and 47 are pressed in a to-be-pressed-in portion (not illustrated) provided inside the housing 7, whereby the connector terminal 1 for a sun visor is fixed to the housing 7.

In this manner, the fixed portion 19 is provided between the mating connection portion 11 and the arm connection portion 17 of the body portion 9, such that vibration from the mating connection portion 11 side to the arm connection portion 17 side or vibration from the arm connection portion 17 side to the mating connection portion 11 side is input to the fixed portion 19, and it is possible to release the vibration to the housing 7.

For this reason, vibration generated on the mating connection portion 11 side or vibration generated on the arm connection portion 17 side is not directly transmitted to the arm connection portion 17 or the mating connection portion 11, and thus it is possible to stabilize contact and to maintain the reliability of connection.

In particular, free movement between the mating connection portion 11 and the mating terminal is not directly transmitted to the arm connection portion 17 by being absorbed by the fixed portion 19, and thus it is possible to suppress influence on an elastic force of the arm connection portion 17 and to stabilize contact between the arm connection portion 17 and the contact portion 31 of the arm portion 15.

The bent portion 21 is provided between the fixed portion 19 and the mating connection portion 11 of the body portion 9 in order to attenuate vibration (free movement occurring between the mating connection portion 11 and the mating terminal) generated on the mating connection portion 11 side.

The bent portion 21 includes a first bent portion 49 and a second bent portion 51.

The first bent portion 49 is provided by performing bending processing so that a planar portion 53 positioned between the mating connection portion 11 and the fixed portion 19 becomes parallel to a planar direction perpendicular to a direction in which the mating connection portion 11 and the mating terminal are fitted to each other.

The first bent portion 49 attenuates vibration (free movement) in a crosswise direction (in the direction of an X-arrow illustrated in FIG. 5) which is generated by the mating connection portion 11 in a state where the mating connection portion 11 and the mating terminal are fitted to each other.

The second bent portion 51 is arranged at an end of the planar portion 53 on the fixed portion 19 side and is provided by performing bending processing on the fixed portion 19 so that the fixed portion 19 becomes parallel to a direction in which the mating connection portion 11 and the mating terminal are fitted to each other.

The second bent portion 51 attenuates vibration (free movement) in a vertical direction (in the direction of a Y-arrow illustrated in FIG. 5) and a front-back direction (in the direction of a Z-arrow illustrated in FIG. 5) which is generated by the mating connection portion 11 in a state where the mating connection portion 11 and the mating terminal are fitted to each other.

In this manner, the bent portions 21 constituted by the first bent portion 49 and the second bent portion 51 are provided, and thus it is possible to attenuate vibration (free movement) generated by the mating connection portion 11 before the vibration is input to the fixed portion 19 and to further reduce the vibration being transmitted to the arm connection portion 17 side.

On the other hand, the bent portion 21 can further attenuate vibration (free movement) generated by the arm connection portion 17 and absorbed by the fixed portion 19 by the bent portion 21 and can also further reduce the vibration being transmitted to the mating connection portion 11 side.

Additionally, the bent portion 21 is provided in the body portion 9, and thus it is possible to arrange the mating connection portion 11 and the arm connection portion 17 in proximity to each other and to miniaturize the housing 7 accommodating the connector terminal 1 for a sun visor.

Figure 11:
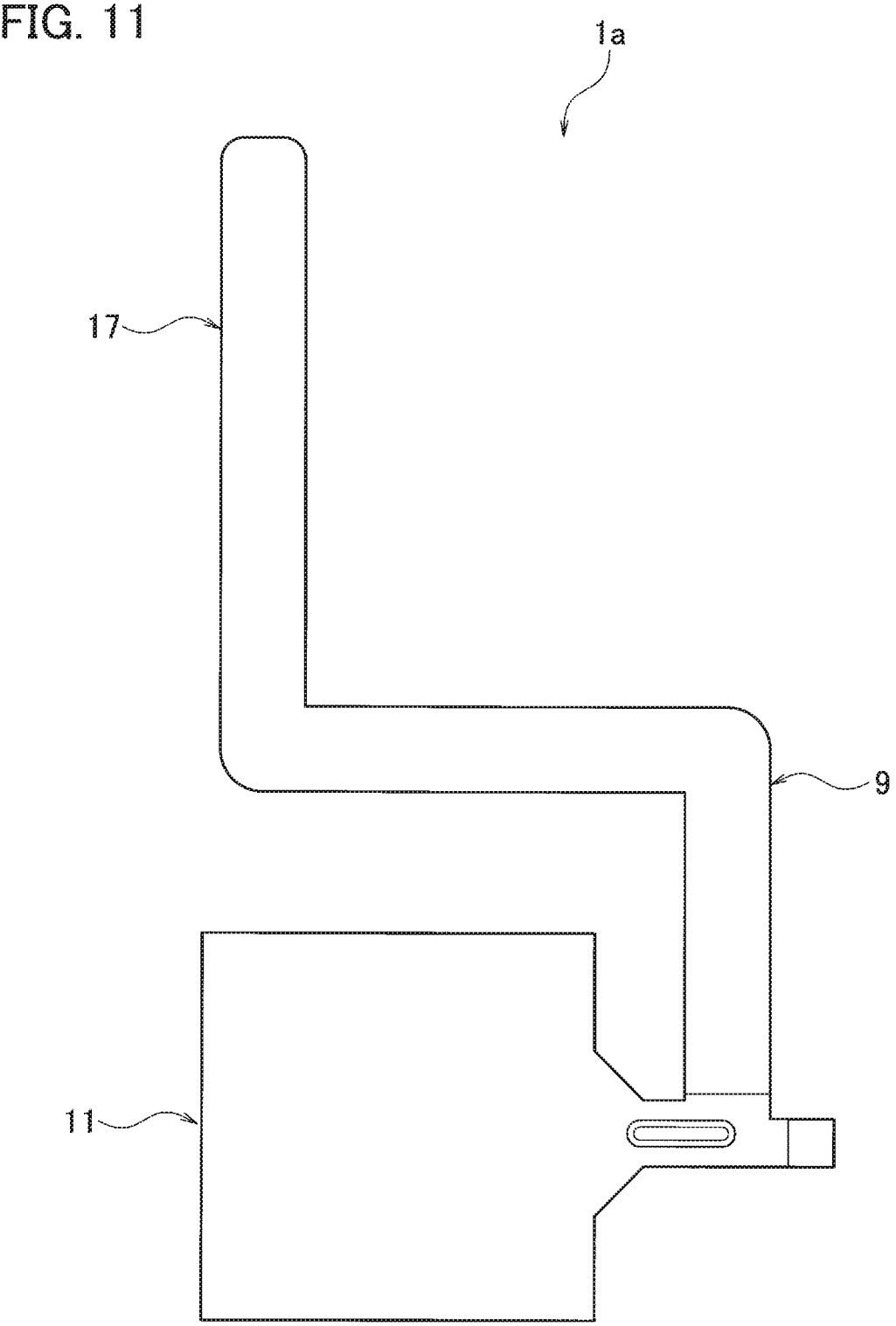
FIG. 11 is a development view of a connector terminal for a sun visor which is not provided with a fixed portion and a bent portion.

Here, a development view of a connector terminal 1a for a sun visor which is not provided with the fixed portion 19 and the bent portion 21 is illustrated in FIG. 11.

Since the connector terminal 1a for a sun visor is not provided with the bent portion 21, the developed shape of the connector terminal is increased, which results in an increase in the cost of a base material for forming the connector terminal for a sun visor.

Figure 10:
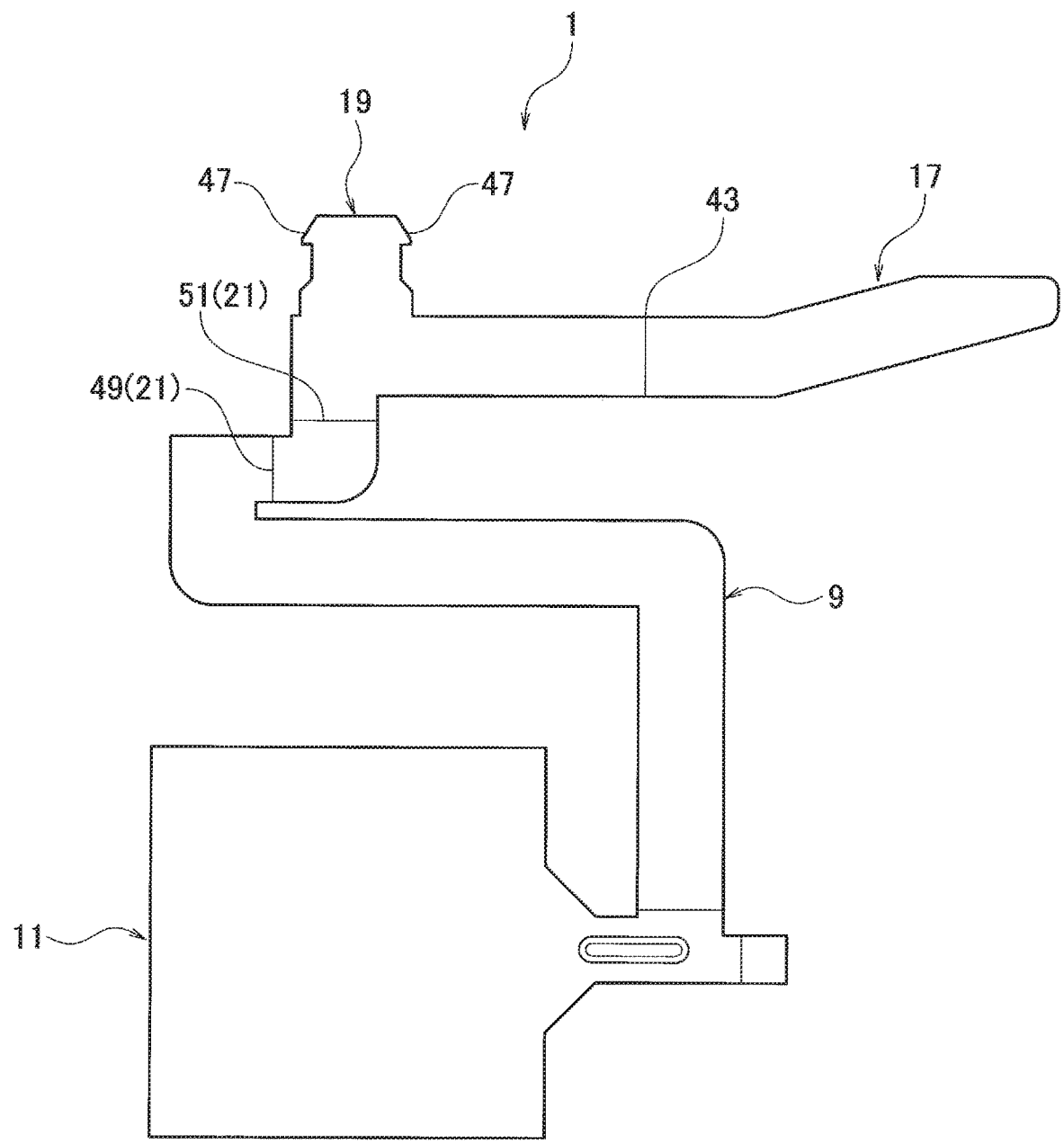
FIG. 10 is a development view of the connector terminal for a sun visor according to the embodiment.

On the other hand, in the connector terminal 1 for a sun visor, the bent portion 21 is provided as illustrated in FIG. 10, and thus it is possible to miniaturize the developed shape of the connector terminal and to reduce the cost of a base material for forming the connector terminal for a sun visor.

In such a connector terminal 1 for a sun visor, the fixed portion 19 fixed to the housing 7 is provided between the mating connection portion 11 and the arm connection portion 17 of the body portion 9, and thus vibration from the mating connection portion 11 side to the arm connection portion 17 side or vibration from the arm connection portion 17 side to the mating connection portion 11 side is input to the fixed portion 19 and is not directly transmitted.

Therefore, in such a connector terminal 1 for a sun visor, a vibration from one side is not directly transmitted to the other side by being absorbed by the fixed portion 19, and thus it is possible to stabilize contact and to maintain the reliability of connection.

In addition, since the bent portion 21 is provided between the mating connection portion 11 and the fixed portion 19 of the body portion 9, it is possible to attenuate vibration by the bent portion 21 and to further maintain the reliability of connection.

Further, since the arm connection portion 17 is provided in the body portion 9 so as to be elastically deformable and the bent portion 21 is provided between the mating connection portion 11 and the fixed portion 19, it is possible to attenuate and absorb vibration from the mating connection portion 11 side to the arm connection portion 17 side by the bent portion 21 and the fixed portion 19 and to suppress influence on an elastic force of the arm connection portion 17.

Meanwhile, in the connector terminal for a sun visor according to the embodiment, a bent portion is provided between a mating connection portion of a body portion and a fixed portion. However, the invention is not limited thereto, and the bent portion may be provided between an arm connection portion and the fixed portion of the body portion.

In addition, the bent portion is provided at two locations, such as a first bent portion and a second bent portion, in the body portion. However, the invention is not limited thereto, and the bent portion may be provided at one location in the body portion or may be provided at three or more locations in the body portion.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes, which come within the meaning and range of equivalency of the claims, are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:
1. A connector terminal for a sun visor, comprising:
a body portion accommodated in a housing fixed to one side of an attachment member of a bracket, the bracket configured to be attached to the attachment member;
a mating connection portion provided on one end of the body portion and connected to a mating terminal arranged on the side of the attachment member;
an arm connection portion provided on the other end of the body portion and connected to an end of an arm portion rotatably supporting a sun visor body arranged on the other side of the attachment member, the end being inserted into the bracket; and a fixed portion provided between the mating connection portion and the arm connection portion of the body portion and fixed to the housing.

2. The connector terminal for a sun visor according to claim 1, wherein a bent portion is provided in at least one of an area between the mating connection portion and the fixed portion of the body portion and an area between the arm connection portion and the fixed portion of the body portion.

3. The connector terminal for a sun visor according to claim 2, wherein the arm connection portion is provided in the body portion so as to be elastically deformable, and the bent portion is provided between the mating connection portion and the fixed portion.

* * * * *